United States Patent [19]

De Pauw et al.

[11] 3,982,549

[45] Sept. 28, 1976

[54] HELICAL ELEMENT ROTOR-AXIAL FLOW COMBINE

[75] Inventors: Richard A. De Pauw, East Moline; David J. Gustafson, Geneseo, both of Ill.

[73] Assignee: International Harvester Company, Chicago, Ill.

[22] Filed: Aug. 28, 1975

[21] Appl. No.: 608,602

[52] U.S. Cl. .............................. 130/27 T; 56/14.6; 130/27 HA
[51] Int. Cl.² ........................................ A01F 12/20
[58] Field of Search ......... 130/27 B, , 27 T, 27 HA; 56/14.5, 14.6, 122–125

[56] References Cited
UNITED STATES PATENTS 2,053,148  9/1936  James.............................. 130/27 T
3,256,887  6/1966  Ausherman....................... 130/27 R
3,828,793  8/1974  Gochanour....................... 130/27 T
3,871,384  3/1975  Depauw et al..................... 130/27 T
3,927,678  12/1975  Rowland et al.................. 130/27 T Primary Examiner—Russell R. Kinsey
Attorney, Agent, or Firm—F. David AuBuchon; Floyd B. Harman

[57] ABSTRACT

A general purpose rasp bar carrying rotor construction for an axial flow-type harvester combine embodying a vaned impeller and a series of bars which cooperate with elements within the surrounding rotor casing for crop threshing and grain separation purposes in a novel and efficient manner. The rotor proper is generally of imperforate tubular cylindrical construction so that the crop material in its entirety is confined to the annulus which exists between the rotor and its casing.

13 Claims, 3 Drawing Figures

HELICAL ELEMENT ROTOR-AXIAL FLOW COMBINE

The present invention relates generally to harvesting combines and has particular reference to that type of combine which is commonly referred to as an axial flow-type combine and wherein the crop material flows axially through the rotor casing within which there is disposed a threshing rotor. The invention is specifically concerned with an improved novel association of the threshing rotor with its surrounding casing.

An axial flow-type combine of the type under consideration herein embodies a generally cylindrical casing having a concave and a succeeding grate, the concave and grate cooperating with bars or blades which are mounted on the rotor, the concave establishing a threshing zone and the grate establishing a separating zone. Inasmuch as a combine of this general character is a mobile agricultural implement having a crop gathering header and a crop elevating feeder at its forward end for severing the crop from the ground and raising it for feeding purposes into the forward end of the rotor casing, unless the rotor is capable of impelling an adequate amount of the gathered material axially through the casing, the forward rate of travel of the combine must necessarily be limited. Otherwise, clogging of the casing at the entrance end thereof will take place due to the inability of the rotor to move the material successively through the threshing and separating zones fast enough to accommodate the oncoming crop material fed thereto by the crop-elevating feeder. This is true in connection with so-called armed rotors of the type disclosed in U.S. Pat. No. 3,481,342 issued on Dec. 2, 1969 where the crop material is able to pass axially and centrally along the rotor with the threshing and indexing action taking place only on such material as is thrown outwardly by centrifugal force to the peripheral regions of the rotor where the peripheral rasp bars exert their action against the concave, grates and the spiral transport vanes. Where tubular rotors are concerned, (i.e. rotors which are in the form of imperforate cylindrical shells so that in any given combine the rotor shell and its surrounding casing establishes a narrow annulus where the usual threshing and separating functions take place successively as the material is moved axially therealong), this situation is compounded because the mat of material which is fed to the forward end of the annulus is restricted to the annulus and is unable to spread out into the central portions of the rotor so that it must traverse the narrow annulus both in the threshing and the separating zones. The material is thus crowded or compacted in such annulus and it has been found that the stationary helical vanes on the rotor casing constitute the sole means for advancing the material through such threshing are inadequate to produce a rapid flow of the material rearwardly. Clogging of the material is thus likely to take place at any region along the rotor but more often it takes place at the entrance region, despite the fact that impeller vanes are usually provided on the forward end of the rotor. Whether armed or tubular type rotors are concerned, it is essential that the rotor be afforded ample time to form a crop mat for efficient and rapid threshing and separating of the grain and, therefore, in either event, if clogging of the material or even undue threshing pressure in the forward region of the rotor housing takes place due to lack of an adequate rearward impelling force, numerous difficulties are encountered. Principal among these difficulties are lack of even threshing along the threshing zone and a sparcity of grain separation along the separating zone. In some crops this axial movement of material is rather inefficient which results in overthreshing the material, high power requirements, excessive material on the cleaning unit and overall lowered efficiency. Other difficulties too numerous to mention, such for example as design difficulties in regulating the radial width of the threshing and separating annulus, in regulating the rate of feed of the crop material to the rotor casing, and controlling the speed of rotation of the rotor, are encountered where the fixed spiral fins on the inside of the rotor casing are relied upon solely for crop mat-impelling purposes.

The present invention is designed to overcome the above-noted limitations that are attendant upon the construction and use of present day mobile harvester combines of the axial flow-type and, toward this end, it contemplates the provision of a combine which is provided with the usual generally cylindrical axially extending rotor casing defining a forward threshing zone including a concave and a rearward grain separating zone including a grate, the casing being provided with conventional spiral transport fins or vanes thereon, together with a coaxial rotor of the tubular type wherein the shell is of relatively large diameter so that, in combination with the surrounding casing, it establishes a relatively narrow annulus which bridges both the threshing and the grain separating zone. A conventional feeder and header conducts the gathered crop material to the forward open end of the annulus so that such material is obliged to pass rearwardly through the annulus for threshing and separating purposes. In order to enhance the rearward flow of such crop material and to establish the usual mat of material which is necessary for proper threshing and grain separation purposes, the rotor shell is provided with a series of specially designed bars on the periphery thereof. Such bars include a series of forwardly disposed helical rasp bars of relatively long helical pitch and which span at least a major portion of the threshing zone, the pitch direction of such rasp bars being such that they impell the crop material rearwardly. These long pitch helical rasp bars can cooperate with relatively short fixed spiral or circumferential vanes to index rearwardly and break up the oncoming mat of crop material and thus enhance the threshing action or these fixed vanes can be eliminated in the threshing zone. In the grain separating zone, the rotor shell is provided with a series of elongated linearly straight. longitudinally extending bars which span the entire grain separating zone and these latter bars cooperate with the spiral vanes or fins on the casing in such zone in the usual manner to index the material rearwardly and effect grain separation in cooperation with the grate which is disposed in such zone. Preferably, but not necessarily, these latter elongated longitudinally extending rasp bars extend a slight distance forwardly and into the threshing zone where they cooperate with the concave in such zone and complete such threshing action as may be absent due to the failure of the helical rasp bars to completely span the entire threshing section.

It is the objective in axial flow type combines that all grain combined in a batch of material fed into the front end of the cylinder pass through the perforate portion of the cylinder by the time the residue of this batch reaches the rear end of the cylinder. The characteristics of this batch of material as well as its make-up changes as it progresses rearwardly. In order to efficiently process the batch of material, of changing characteristics, it is necessary that the cooperating elements of the rotor and casing at a given point along the cylinder are appropriate for the characteristics of the material when it reaches that point. This is complicated by the fact that a commercially feasible combine must be capable of harvesting a large variety of crops, and adaptive to a variety of conditions for each of these crops.

Obviously an optimum rotor and casing could be designed for each crop and crop condition but this would increase considerably the capital investment of the combine operator and the work and time required to prepare a combine for operation. It is the purpose of this invention to provide a universal rotor for an axial flow-type combine that can perform acceptably in a large variety of crops and crop conditions.

In the illustrated embodiment of the invention, the extreme forward end region of the rotor casing is provided with an enlarged frusto-conical transition section within which there operates a vaned impeller, such transition section serving to further enhance the rearward flow of material through the annulus and also serving to increase the capacity of the combine by increasing the feed of crop material thereto. For a more detailed disclosure of such a conical infeed reference can be had to U.S. Pat. No. 3,827,443 issued on Aug. 6, 1974. Additionally, in the illustrated form of the invention, the rotor casing is provided with an expansion chamber at its extreme rear end and a series of rotor vanes on the extreme rear end of the rotor operate within such expansion chamber to fling the threshed residue material from the rotor so that it will not bind against the casing, after which it may fall by gravity to a region of discharge. For a more detailed disclosure of such an expansion chamber reference can be had to U.S. Pat. No. 3,863,643 issued on Feb. 4, 1975.

Although this invention is disclosed in a single rotor axial flow-type combine it of course could be used in a multiple rotor axial flow-type combine. For a disclosure of a dual rotor axial flow-type combine reference can be had to U.S. Pat. No. 3,626,472 issued on Dec. 7, 1971.

The provision of an axial flow combine such as has briefly been outlined above constitutes the principal object of the present invention. Numerous other objects and advantages, not at this time enumerated, will readily suggest themselves as the nature of the invention is better understood.

DESCRIPTION OF THE DRAWINGS

In the accompanying two sheets of drawings forming a part of this specification, one illustrative embodiment of the invention has been shown.

Figure 1:
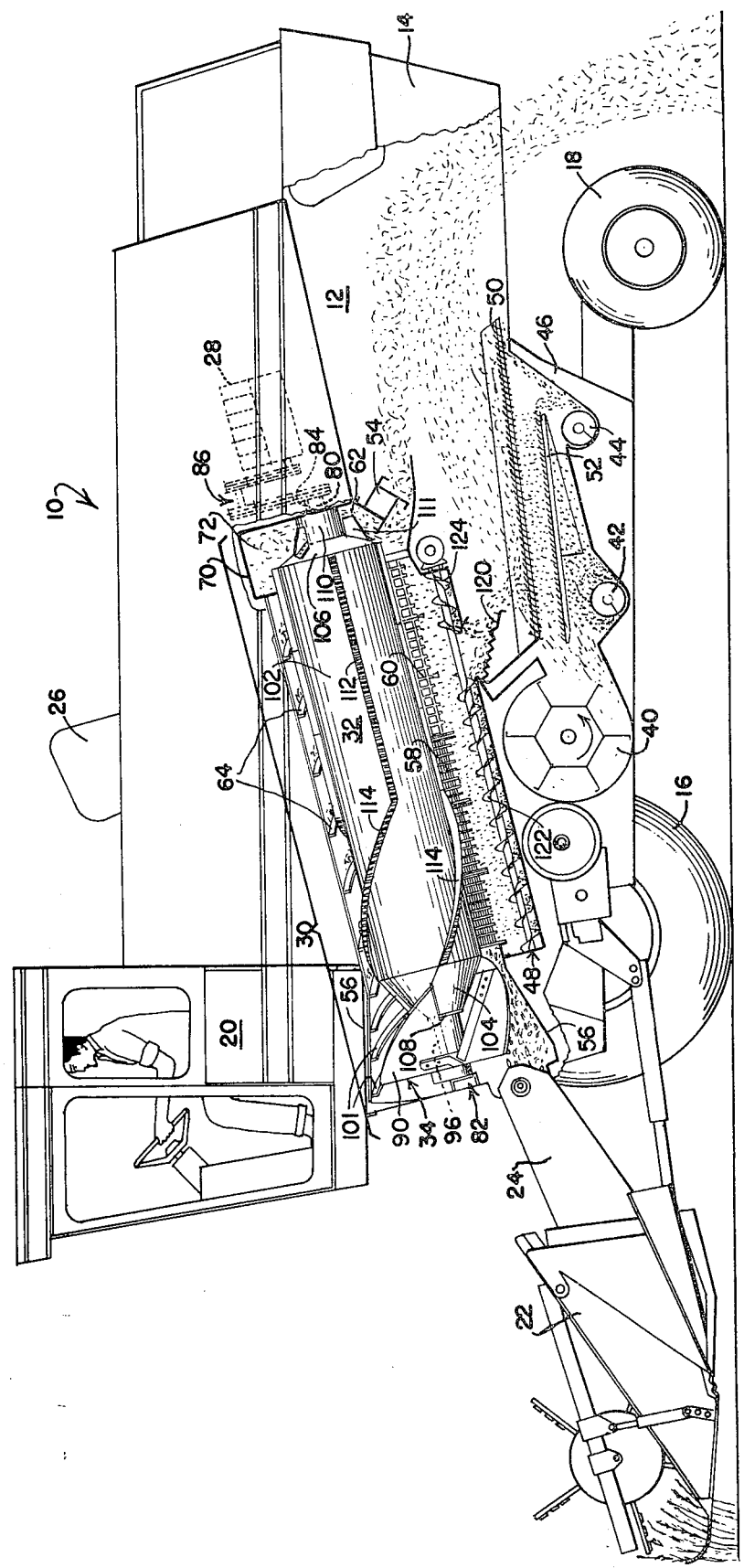
FIG. 1 is a side elevational view of an axial flow-type combine embodying the improved tubular rotor of the present invention, a major portion of one side wall being removed to reveal the crop-impelling means, the crop-gathering means, the axial threshing and separating means, the grain cleaning and handling means, and the residue discharge means.

Referring now to the drawings in detail and in particular to FIG. 1, an axial flow-type combine is designated in its entirety by the reference numeral 10, the combine being of the general type shown and described in the above referred to U.S. Pat. No. 3,481,342. The combine 10 involves in its general organization a chassis or body portion 12 having vertical side walls 14, the body portion being supported by a pair of relatively large drive wheels 16 at the front region of the combine, and a pair of steerable or dirigible wheels 18 at the rear of the combine. The combine further includes an operator's platform and cab 20, a crop-gathering header 22, a feeder 24, a grain elevator 26 and an engine 28. A grain tank (not shown) is enclosed within the walls of the body portion 12. As is the case in connection with axial flow-type combines of the character under consideration, the axial threshing and separating means are embodied in a single unit in the form of an elongated and generally cylindrical member 30 which comprises an open-ended rotor casing and a generally cylindrical rotor 32 mounted therein. The forward end of the rotor 32 carries a vaned impeller 34 of the helix type. The term open-ended rotor casing is intended to define all designs of infeed whether above or below the rotor axis, to the front face or undersurface of the impeller. The present invention is concerned primarily with the nature of the rotor 32 and its associated rotor casing, and particularly in the manner in which such casing and rotor cooperate with each other for crop threshing and separating purposes.

Other conventional combine components not specifically related to the present invention, and which are more or less schematically disclosed herein are the blower 40, clean grain auger 42 leading to the aforementioned grain elevator 26, and tailings auger 44, these components being enclosed within a lower casing section 46 beneath the chassis or body portion 12. Enclosed within the body portion 12 and beneath the cylindrical rotor casing 30 is an elongated screw conveyor 48 which receives threshed and separated grain from the concave and grate sections of the rotor casing and discharges such grain onto a chaffer sieve 50. The chaffer sieve is reciprocated in a fore and aft direction so as to pass grain and tailings to a grain sieve 52 which is disposed immediately beneath the chaffer sieve and the latter also is reciprocated to separate the grain from the tailings so that the grain passes through such sieve and onto the clean grain auger 42 while the tailings are delivered rearwardly to the tailings auger 44. The blower 40 produces an air current flowing through chaffer sieve 50 and grain sieve 52 to carry away the chaff. The clean grain collected by auger 42 is delivered through the elevator 26 to the grain tank, while the tailings are returned to the cylindrical rotor casing 30 by elevator means (not shown). A terminal beater 54 which is disposed beneath the rear end of the rotor casing 30 prepares the straw residue for discharge from the combine rearwardly thereof as clearly shown at the right hand side of FIG. 1.

Still referring to FIG. 1, the elongated cylindrical rotor casing 30 extends along the longitudinal axis of the combine 10 and the forward end thereof is provided with a frusto-conical transition section 56 which is so termed because it represents a funnel-like entrance mouth by means of which material that is fed rearwardly from the feeder 24 in the form of a relatively wide mat is shrunk, so to speak, and caused to enter the remaining portion of the rotor casing for threshing and separating functions which are to be performed within the casing upon this material. The vaned impeller 34 is provided with a vane arrangement which closely mates with the inner frusto-conical surface of the transition section 56. The material which enters the truly cylindrical portion of the casing 30 passes between such portion and the tubular rotor 32 and is processed as it travels rearwardly through the annulus which exists between the casing and rotor, the threshed grain escaping from the casing through the apertured bottom which is made up of a concave 58 and a grate 60.

Generally speaking, the longitudinal span of the concave 58 establishes a threshing area or zone while the longitudinal span of the grate 60 establishes a grain separating area or zone.

The straw and other waste material is discharged through a straw discharge opening 62 which is provided in the lower region of the rear end portion of the casing 30. A plurality of spiral transport fins 64 are fixedly secured to the upper internal surface of the cylindrical member 30, these fins functioning, in combination with the rotor 32, to index the material axially and rearwardly through the annulus which exists between the casing and the rotor and which extends from the frusto-conical transition section 56 to the straw discharge opening 62. Although transport fins 64 are disclosed as spiral and extending along the entire length of the rotor casing 30 it is contemplated that they could extend circumferentially or be eliminated in the threshing area or zone. The rear end of the rotor casing 30 is formed with an enlarged diameter section 70 which, in effect, defines a cylindrical expansion chamber 72 within which the straw or other crop residue which approaches the rear end of the casing is given a swirling motion by the rotor 32 in a manner that will be made clear presently so that it is thus loosened and caused to be flung by centrifugal force through the discharge opening 62.

The lower region of the rear half of the casing 30 is defined by the provision of the aforementioned perforate grate 60 which is less aggressive than is the concave 58. The concave 58 can be constructed of a plurality of parallel ribs through which a series of small diameter wires extend, and the grate can be comprised of a curved sheet of perforate metal stock. The concave 58 can be provided with adjusting means (not shown) by means of which it may be adjusted relative to the axis of the rotor 32, and also with means whereby it may be removed from the combine for purpose of cleaning, repair, or replacement. For a complete disclosure of such a concave reference may be had to U.S. Pat. No. 3871,384 issued Mar. 18, 1975 and entitled "Removable Concave for an Axial Flow-Type Combine and Adjusting Means Therefor. The grate 60 is likewise preferably removable to the end that grates having appropriate size apertures for use with varying crops may be interchanged. For a full understanding of the manner in which the concave 58 and grate 60 are adjustable and removably associated with the rotor casing 30, reference may be had to the above referred to U.S. Pat. No. 3,871,384, the entire subject matter of which, insofar as it is consistent with the present disclosure, is incorporated in and made a part of this application by reference thereto.

The arrangement of parts thus far described, with the exception of the rotor 32, as well as its association with the impeller 34 and the associated frusto-conical transition section 56 of the casing 30, is purely conventional and no claim is made herein to any novelty associated with the same, the novelty of the present invention residing rather in the rotor construction and its cooperation with the surrounding casing components as will be described in detail presently.

Figure 3:
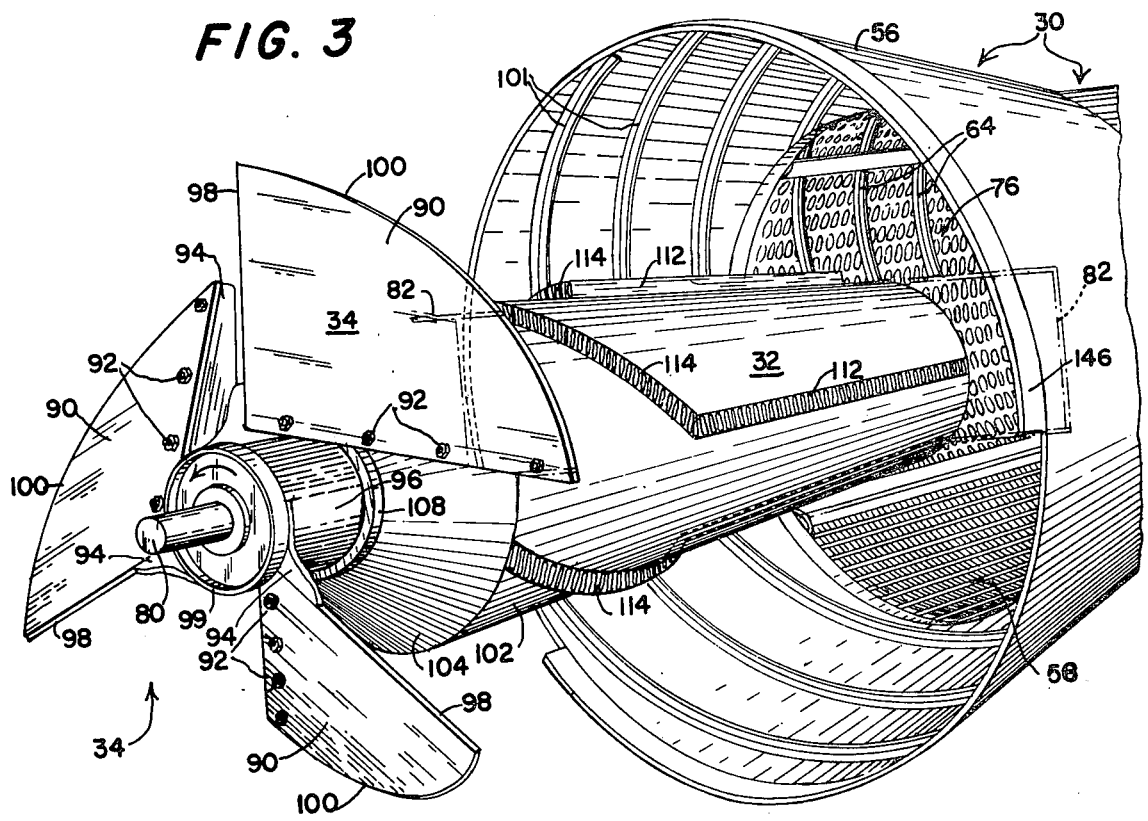
FIG. 3 is an enlarged exploded fragmentary front perspective view of the rotor casing and its associated rotor and impeller, the front wall of the casing being removed in the interests of clarity.

The rotor 32 is rotatably journalled for operation within the rotor casing 30 and it is provided with a central axial rotor shaft 80 which has its forward end rotatably supported by a transverse bar 82, a projection of which appears in FIG. 3 in broken lines, the bar being generally of forwardly facing channel shape and constituting an element of the combine chassis 12. The rear end of the rotor shaft 80 is rotatably journalled in a hub-like bearing 84 which is carried by the rear wall of the enlarged diameter section 70 of the rotor casing 30 externally thereof. A suitable variable pitch belt and pulley drive mechanism 86 extends between the rear end of the shaft 80 and the engine 28 and establishes a driving connection for the rotor 32.

Figure 2:
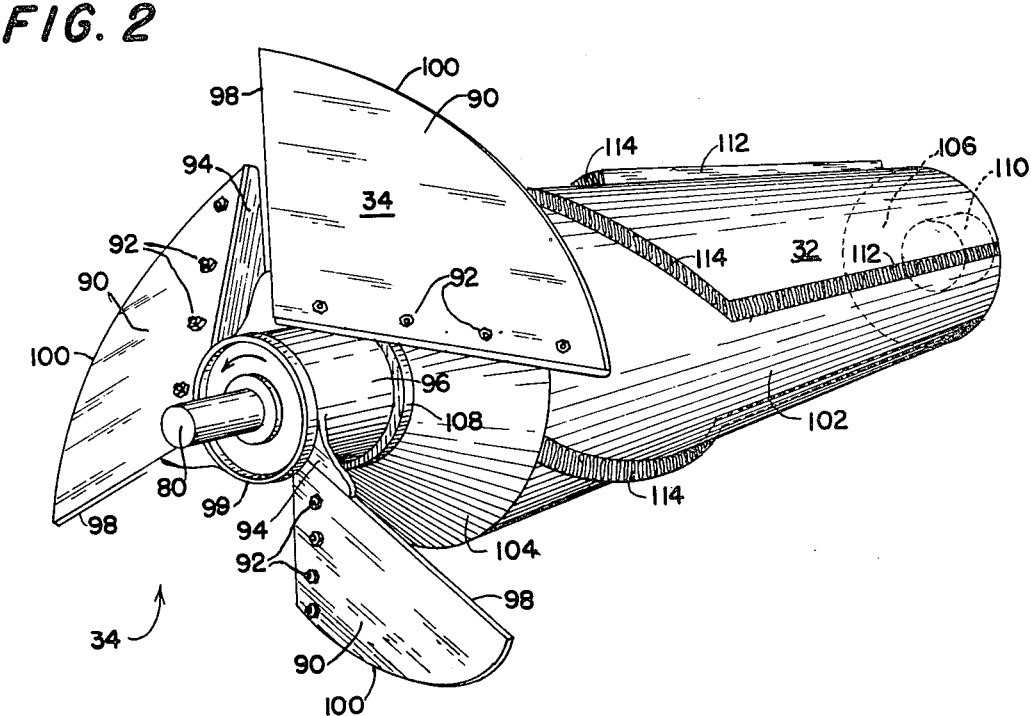
FIG. 2 is an enlarged isolated front perspective view of the rotor and its associated impeller.

The impeller 34 includes a plurality of vanes or helix flights 90 which are in the form of generally flat triangular sheet metal vanes which have linearly straight edges secured by bolts 92 (FIGS. 2 and 3) to bolting flanges 94 provided on a central hub 96 which is fixedly mounted on the forward end region of the rotor shaft 80. Preferably the vanes 90 are three in number and each vane, in addition to its bolting edge, is provided with a linearly straight, substantially radially extending leading edge 98, and an arcuate edge 100. As shown in FIGS. 2 and 3, the central hub 96 which supports the various impeller vanes 90 carries a circular sealing disk 99 which projects into a recess (not shown) associated with the transverse bar 82, the recess and disk establishing a protective dust seal for a bearing assembly (likewise not shown) by means of which the rotor shaft 80 is journalled in the bar 82. Such bearing assembly and dust seal constitute no part of the present invention so the details thereof have not been illustrated herein. However, for a full disclosure thereof, reference may be had to U.S. Pat. No. 3,828,794, issued on Aug. 13, 1974 the entire subject matter of which, insofar as it is consistent with the present disclosure, incorporated in and made a part of the present application by reference thereto.

During rotation of the impeller 34, the extended outline of the three vanes or flights 90 generates a cone frustum having a slant angle which is substantially equal to the slant angle of the frusto-conical transition section 56 of the rotor casing 30 so that the small clearance which exists between each arcuate outside edge 100 and the adjacent inner surface of the transition section 54 is substantially constant throughout the extent of such edge. Specifically, since the vanes 90 are substantially planar, the extended planes thereof intersect the cone frustum of the transition section 54 along approximately parabolic lines, such being the conic section which results from the intersection of a plane and a cone frustum. Thus, to maintain such constant clearance between the vanes 90 and the transition section 56, the outer edges 100 of the vanes 90 are preferably of substantially parabolic curvature. The impeller 34, in combination with the frusto-conical transition section 56 of the rotor casing 30, serves to funnel the crop material into the cylindrical section of the rotor casing and thus permit the use of a rotor which has an overall mean diameter which is appreciably smaller than the minimum diameter which is permissible in the absence of such transition section. A plurality of spiral transport fins 101 which are similar to the fins 64 are provided internally on the wall of the transition section 56. By the use of such transition section, in combination with a correspondingly shaped impeller, the width of the feeder 24 is not limited by the diameter of the cylindrical portion of the rotor casing 30 and thus an appreciable amount of excess crop material may be fed into the cylindrical working section of the rotor casing.

As clearly shown in FIGS. 2 and 3, the rotor 32 is generally of tubular cylindrical construction and, for purposes of discussion herein, it may be regarded as constituting one component of a composite rotor assembly, the latter further including the vaned impeller 34 which is secured thereto and rotates bodily in unison therewith. The rotor proper 32 is of hollow construction and it includes an axially elongated cylindrical wall 102, a forward frustoconical section 104 and a rear frusto-conical section 106. The forward section 104 has a slant angle on the order of 45° and the forward small base or rim thereof is provided with a forwardly extending annular flange 108 which embraces and is secured to the hub 96 in sealing relationship. The rear section 106 has a somewhat steeper slant angle and the rear small base or rim of such section similarly embraces and is secured to a rear hub 110 which is fixedly mounted on the rotor shaft 80 near the rear end thereof. A plurality of vanes 111 (FIG. 1) of gusset-like construction are provided on the hub 110 and frustoconical section 106 and impart a swirling action to the crop residue within the expansion chamber 72, thus loosening such material from the rotor and allowing it to fall by gravity through the discharge opening 62. It is contemplated that the cylindrical wall 102 and bar sections 112 could extend to the rear of the rotor thus eliminating the rear frusto-conical section 106, rear hub 110 and vanes 111.

A plurality of bar components or sections are fixedly secured to the outer surface of the cylindrical wall 102 of the rotor 32, such components being arranged in three identical series which are circumferentially spaced around the rotor so that each series lies within a 120° sector of the rotor. Each series of bars includes an elongated longitudinally extending linearly straight bar section 112 which commences a slight distance forwardly of the grain separating area so that it spans a limited portion of the concave 58 and all of the grate 60, and a helical rasp bar section 114 which commences at the juncture region between the frustoconical section 104 and the cylindrical section 102 of the rotor 32 and joins the forward end of the longitudinally extending bar section 112.

In the illustrated embodiment of the rotor 32, the circumferential span of each of the three helical sections 114 is approximately 120° while the longitudinal span thereof is approximately four-tenths of the total length of the cylindrical section 102 of the rotor 30. However, within certain limits, such spans and circumferential extents may be varied if desired. Furthermore, under certain circumstances, if desired, a greater or lesser number of such circumferentially spaced series of rasp bar components may be employed if desired, the essential arrangement being such that the helical rasp bars 114 operate as combined threshing and transport rasp bars within the threshing section of the combine while the elongated rasp bars 112 operate within the grain separating section.

The overall operation of the herein described combine is similar in many respects to that of the axial flow combine disclosed in either of the aforementioned U.S. Pat. Nos. 3,827,443 and 3,863,643, at least insofar as the feeding of crop material to the conical transition section 56 of the rotor casing 30, and also insofar as the discharge of material to the terminal beater 56 are concerned. It is not deemed necessary herein to describe in detail such phases of combine operation since reference to these two patents will suffice for a full understanding of how the material to be threshed is fed to the rotor casing 30 and how the threshed material is discharged therefrom. A full discussion will, however, be made of the functions that take place in both the threshing zone in the vicinity of the concave 58 and in the separating zone in the vicinity of the grate 60.

Accordingly, it is to be noted, especially from an inspection of FIG. 1, that the longitudinal span of the various helical rasp bar sections 114 bridges the longitudinal span of several of the spiral transport fins 64 on the rotor casing 30, and also that the pitch direction of helical and spiral extent, both as regards the fins 64 on the casing 30 and the rasp bars 114 on the rotor 32, is such that with the rotor being driven in a counterclockwise direction as viewed in FIGS. 2 and 3, the radially opposed rasp bar sections and spiral transport fins cooperate with one another in relatively close proximity to urge the material undergoing threshing axially and rearwardly through the annulus which exists between the rotor and the rotor casing. It should be noted that as the helical rasp bars 114 pass over the concave 58 the material that does not pass through concave 58 is indexed rearwardly.

Because of the fact that the rotor shell is imperforate, the material undergoing threshing is confined to the annulus where it comes into intimate contact with the spiral vanes and the opposing helical rasp bars and is thus excluded from the central regions of the rotor as is the case with armed rotors so that the rasping action is exerted upon a relatively thin cylindrical web or mat of material passing along the annulus where a rubbing action, so to speak, is exerted by the rasp bars, thus resulting in a more effective comminution of the material than is the case where long strands of material may escape the action of the rasp bars by short circuiting axially along the open center of an armed type rotor.

Few, if any initially long lengths of straw or other crop material are able to avoid the cooperating action of the concave and helical rasp bars and such long material as may is broken into small sub-divisions, after which it is transported to the grain separation section of the casing where further threshing and grain separating operations are carried out thereon by the linearly straight bars 112, in combination with such spiral transport fins 64 as are bridged by the bars 112.

Although the helical rasp bars 114 and the linearly straight bars 112 are illustrated herein as being continuous, it is within the purpose of the invention to fashion these rasp bars in subdivided sections which may be placed in end-to-end fashion and anchored in position to produce, in effect, continuous rasp bar components.

It is to be noted at this point that the three helical rasp bar sections 114, and also a limited forward region of each of the three elongated linearly straight rasp bar sections 112, function in the threshing zone in co-operation with the concave 58, while the remainder of the bar sections 112 function in the separating zone in co-operation with the grate 60. The grain which is thus separated out in these zones falls by gravity to the screw conveyor 48 which spans both the threshing and separating zones beneath the concave 58 and grate 60 where it is discharged by means of a reciprocating rack 120 onto the chaffer sieve 50. It is also to be noted that the screw conveyor 48 embodies a relatively long forward screw impeller section 122 and a relatively short rear coaxial screw impeller section 124, the two sections being of opposite pitch so that the grain or other material issuing from the threshing and separating zones is discharged from the conveyor 48 at a medial region and deposited on the reciprocating rack 120 and from thence conducted to the chaffer sieve 50.

The invention is not to be limited to the exact arrangement of parts shown in the accompanying drawings or described in this specification as various changes in the details of construction may be resorted to without departing from the spirit of the invention. Therefore, only insofar as the invention has particularly been pointed out in the accompanying claims is the same to be limited.

What is claimed is:

1. In an axial flow-type combine, in combination, an elongated generally cylindrical open-ended rotor casing having a concave establishing a forward threshing zone, and a grate establishing a rearward separating zone, the forward open end of said casing being designed for reception of crop material, a series of spaced apart spiral transport fins fixedly secured to the upper region of said rotor casing internally thereof, a rotor of a generally cylindrical imperforate tubular construction mounted for rotation within said casing in coaxial relationship and substantially co-extensive therewith, a plurality of circumferentially spaced elongated helical transport rasp bars mounted on the cylindrical peripheral region of said rotor in said threshing zone and designed for cooperation with said concave in such zone for threshing and impelling the crop material rearwardly, a plurality of circumferentially spaced elongated longitudinally extending bars mounted on the cylindrical peripheral region of said rotor in the separating zone and designed for cooperation with the transport fins for impelling the crop material rearwardly, and means for driving said rotor.

2. In an axial flow-type combine, the combination set forth in claim 1, wherein each of the elongated helical transport rasp bars in said threshing zone has a longitudinal span which is equal to a major portion of the longitudinal extent of the threshing zone, while each of said elongated longitudinally extending bars is substantially coextensive with said separating zone.

3. In an axial flow combine, the combination set forth in claim 2, wherein the forward end of each longitudinally extending bar merges with the rear end of an associated helical transport rasp bar.

4. In an axial flow-type combine, the combination set forth in claim 3, wherein each of said longitudinally extending bars are fully coextensive with said separating zone and the forward end region thereof projects a slight distance forwardly into the threshing zone.

5. In an axial flow-type combine, the combination set forth in claim 3, wherein said rotor is of generally cylindrical imperforate tubular construction and is provided with a closed forward end the various bars are fixedly mounted on the outer cylindrical surface of the rotor.

6. In an axial flow-type combine, the combination set forth in claim 5 wherein the merging helical and longitudinal bars are three in number and are circumferentially spaced from one another 120° apart.

7. In an axial flow-type combine, the combination set forth in claim 6, wherein the circumferential span of each helical rasp bar is on the order of 120°.

8. In an axial flow-type combine, in combination, an elongated generally cylindrical rotor casing having a concave establishing a forward threshing zone, and a grate establishing a rearward separating zone, the forward end of said threshing zone being provided with a forwardly and outwardly flared funnel-like frusto-conical transition section designed for reception of crop material, a series of spaced apart spiral transport fins fixedly secured to the upper region of said rotor casing internally thereof, a generally cylindrical imperforate tubular rotor mounted for rotation within said casing in coaxial relationship and substantially coextensive therewith, a vaned impeller on the forward end of said rotor within the frusto-conical transition section having vanes which sweep around the inner surface of said transition section in coextensive close proximity thereto for moving the crop material received in said transition section rearwardly into said threshing zone, a plurality of circumferentially spaced elongated helical rasp bars mounted on the outer cylindrical surface of said rotor in said threshing zone and designed for cooperation with said concave for threshing and impelling the crop material rearwardly, a plurality of circumferentially spaced elongated longitudinally extending bars mounted on the outer cylindrical surface of said rotor in said separating zone and designed for cooperation with said transport fins in such zone, and means for driving said rotor.

9. In an axial flow-type combine, the combination set forth in claim 8, wherein each of the elongated helical transport rasp bars in said threshing zone has a longitudinal span which is equal to a major portion of the longitudinal extent of the threshing zone, while each of said elongated longitudinally extending bars is substantially co-extensive with said separating zone.

10. In an axial flow-type combine, the combination set forth in claim 9, wherein the forward end of each longitudinally extending bar merges with the rear end of an associated helical transport rasp bar.

11. In an axial flow-type combine, the combination set forth in claim 10 wherein each of said longitudinally extending bars are fully coextensive with said separating zone and the forward end region thereof projects a slight distance forwardly into the threshing zone.

12. In an axial flow-type combine, the combination set forth in claim 10 wherein the merging helical and longitudinal bars are three in number and are circumferentially spaced from one another 120° apart.

13. In an axial flow-type combine, the combination set forth in claim 12 wherein the circumferential span of each helical rasp bar is on the order of 120°.

* * * * *